Figure 1:
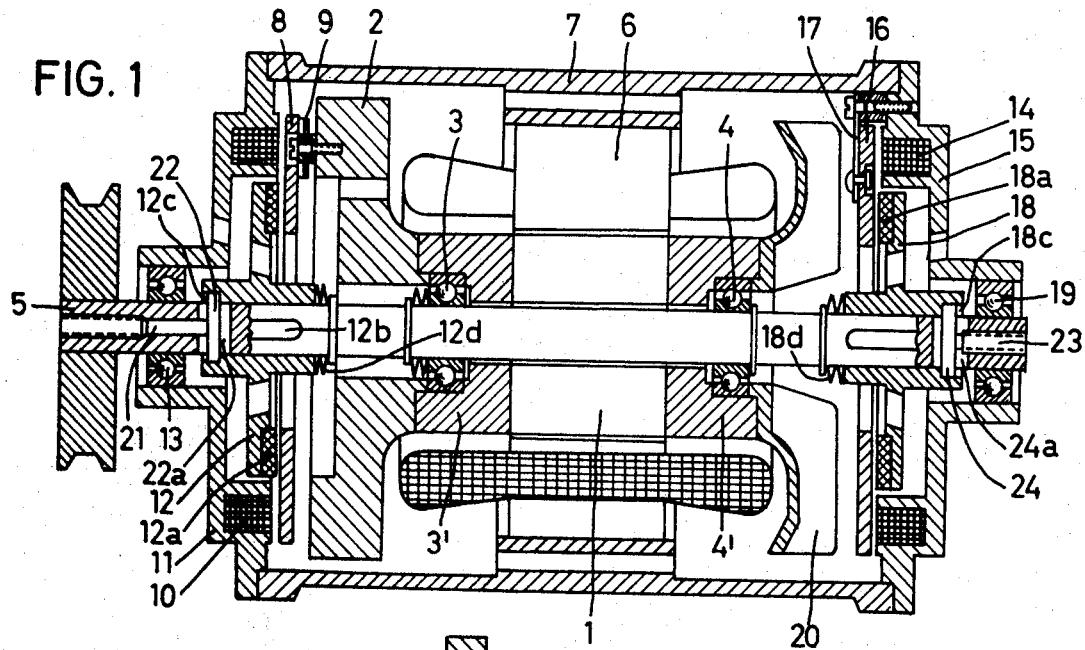

United States Patent [19]

Lengsfeld

[11] 3,750,781

[45] Aug. 7, 1973

[54] ELECTRIC-MOTOR WITH BUILT-IN ELECTROMAGNETIC DISK CLUTCH AND BRAKE

[76] Inventor: Karl Lengsfeld, Paul Bonnerstr. 15, Plankstadt, Germany

[22] Filed: June 24, 1971

[21] Appl. No.: 156,453

[30] Foreign Application Priority Data
June 26, 1970 Germany .................. P 20 31 834.7

[52] U.S. Cl. ................ 192/18 B, 192/84 C, 310/76
[51] Int. Cl. ............................................. F16d 67/06
[58] Field of Search .............. 192/18 B, 18 A, 18 R, 192/12 D; 310/98, 76

[56] References Cited
UNITED STATES PATENTS

| | | | |
|---|---|---|---|
| 3,446,322 | 5/1969 | Wrensch | 192/18 B |
| 3,487,438 | 12/1969 | Becker et al. | 192/18 B |
| 3,123,193 | 3/1964 | Marland | 192/18 B |
| 2,836,270 | 5/1958 | Leopold | 192/18 A |
| 2,848,085 | 8/1958 | Mannaioni | 192/18 B X |
| 3,322,249 | 5/1967 | Klinkenberg et al. | 192/18 B |
| 3,563,114 | 2/1971 | Casale | 192/18 R |
| 3,638,773 | 2/1972 | Lewis | 192/18 A |

Primary Examiner—Benjamin W. Wyche
Attorney—Browdy & Neimark

[57] ABSTRACT

An electric-motor controlled variable speed drive with built-in electro-magnetic disk clutch and brake especially for industrial sewing machine is disclosed having a rotor, flywheel and clutch magnetic armature ring mounted as a remit on the driven shaft, and a combined clutch and brake axle disk is mounted on the shaft externally adjustable axially thereon.

3 Claims, 2 Drawing Figures

BY Karl Lengsfeld
INVENTOR.
Browdy and Neimark
Attorney

ELECTRIC-MOTOR WITH BUILT-IN ELECTROMAGNETIC DISK CLUTCH AND BRAKE

The invention concerns an electric-motor controlled variable speed drive, having a built-in electromagnetic clutch and brake, especially for industrial sewing machines.

Low-inertia starting and braking are required for such electric-motor controlled variable speed drives. The inertial moment of such a drive should be very low. Economical operation is required for industrial applications, with economical operation being understood as low purchase price, simple operation, long service life and low susceptibility to trouble.

In previously known electric-motor controlled variable drives of the type described above, two separately mounted shafts are used for the clutch and brake assemblies, with a detrimental effect on the design and characteristics of the motor. Clutching and braking produce noises that it is often very difficult to reduce or eliminate. The heavy magnetic armature disks mounted on the clutch shaft create a high inertial moment that has a damping effect on rapid changes in speed and control. In addition, adjustment of the clutching or braking time is possible only by means of expensive measures.

Drives are also known which allow rapid starting and quick braking. It is necessary, however, to allow higher technical expenditures and accept higher power losses.

An object of the present invention is to provide a regulating and control drive, with built-in electromagnetic clutch and brake, in which the inertial moment on the drive shaft is reduced which allows a simple (possible external) adjustment of the clutch and brake coating as it wears, as well as an adjustment of the air gap between the magnet and the magnetic armature ring, and which is simple to manufacture and allows manual operation as well as programmed control.

These objects are accomplished according to the present invention mainly through the fact that the rotor, flywheel and clutch magnetic armature ring are combined into a unit mounted on a single shaft, which is simultaneously the drive shaft to be controlled.

According to an advantageous embodiment of the invention, a combined clutch-and-brake axle disk is mounted on the shaft, said brake axle disk being externally adjustable in the axial direction.

It is especially advantageous if a constantly turning magnetic armature ring serves as the disk clutch and a shoe brake is used for braking, both acting on a common clutch-and-brake axle disk.

According to a further advantageous embodiment of the invention, it is desirable to have the bearing plates the same shape and in the form of magnets.

According to another feature of the invention, it is advantageous to mount on the shaft two axle disks of the same shape, each adjustable from outside and each fitted with a friction lining.

Figure 2:
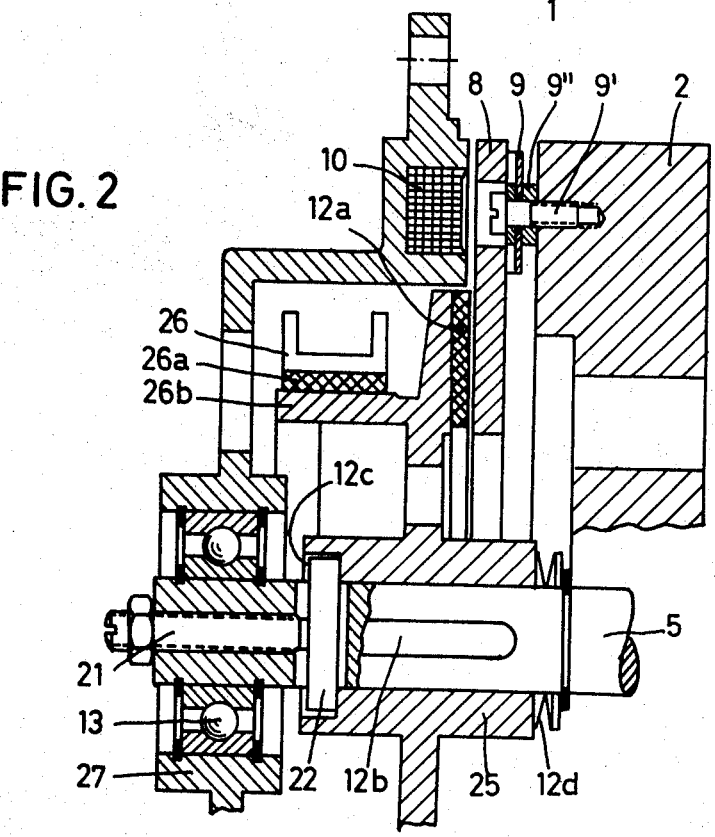

Further advantages and features of the invention will be evident from the drawing, which shows an example of an embodiment of the invention wherein:

FIG. 1 is a cross sectional view showing one form of construction for a controlled variable speed drive according to the invention; and FIG. 2 is a cross sectional view showing a second form of construction according to the invention.

The electric-motor variable speed drive with control according to the invention, as shown in FIG. 1, consists of a basic motor and control elements, wherein a roughly disk-shaped flywheel 2, made of cast iron, for example, is bolted to one side of rotor 1 of the drive motor, a ball bearing 3 mounted in an elongated aluminum short-circuiting ring 3' on rotor 1 being simultaneously mounted axially opposite the rotor through said flywheel 2. On the opposite side of rotor 1, a bearing 4 is likewise mounted in an elongated aluminum short-circuiting ring 4' and is fastened there, axially opposite rotor 1, by a fan 20.

Rotor 1 rotates constantly about shaft 5 in the electrical field of a stator 6, said rotor being axially non-adjustable in bearings 3, 4, but free to rotate. Stator 6 is mounted in a stator housing 7. A clutch magnet armature ring 8 is bolted to flywheel 2 through an elastic spring plate 9. Spring plate 9 consists (for example) of a stamped steel ring with, for example, 8 holes. Four holes serve to fasten this spring plate 9 by means of bolts 9' to flywheel 2, while center plates 9" serve to brace the clutch magnet armature ring, thereby preventing tumbling action. The other four holes serve to fasten the spring plate 9 to the clutch magnet armature ring 8, not shown in the drawing. This clutch magnet armature ring 8 is attracted more or less by control pulses from an electrical clutch magnet 10, serving simultaneously as clutch bearing plate 11, this movement being allowed by its being fastened to elastic spring plate 9; clutch magnet armature ring 8 is thereby coupled to a clutch disk 12 with a friction lining 12a. This clutch disk 12 is mounted axially adjustable on shaft 5 and rotates the latter through a slot-and-feather coupling 12b or a spline-and-groove coupling. On the right-hand side of FIG. 1, the brake side, an electrical brake magnet 14 is mounted, also serving as bearing plate 15. An annular brake magnet armature 16 is firmly screwed to this brake bearing plate 15 by means of a spring membrane disc 17, so that this brake magnet armature 16 is also axially displaceable by virtue of the flexibility of spring membrane disc 17.

When a current pulse enters brake magnet 14, brake magnet armature 16 is drawn against a brake disc 18 provided with a friction coating 18a and shaft 5 is braked, said shaft being supported at this point by a grooved ball bearing 19 in brake bearing plate 15. Brake disk 18 has the same shape as clutch disk 12 and is mounted in the same fashion on shaft 5 — non-rotating, but axially adjustable.

Fan 20 serves for cooling. Clutch disk 12 can be adjusted on a pin 22 with the aid of an adjusting screw 21 mounted in shaft 5. Similarly, brake disk 18 can be adjusted on a pin 24 with the aid of a screw 23. Pins 22 and 24 are adjustable in radial lengthwise holes 22a and 24a of shaft 5 and fit into recesses 12c and 18c in the hubs of clutch disk 12 and brake disk 18, which are pressed firmly against pins 22 and 24 by springs 12d and 18d, fastened on one side to the shaft. The air gap between friction lining 12a of clutch disk 12 and clutch magnet armature ring 8, and between friction lining 18a of brake disk 18 and brake magnet armature 16, is adjustable from approximately 0.1 to 1.0 mm.

By means of selective control of magnets 10 and 14, this drive can be shifted and controlled by electric or electronic programming.

In this embodiment of the invention, it is advantageous for the drive shaft 5 to have only a very slight inertial moment, since this shaft carries only the clutch and brake disks 12, 18 which are made of aluminum.

The continuous shaft gives the motor high stability and accuracy of alignment. Doing away with the previously used clutch bearing plate and the extra clutch shaft reduces susceptibility to trouble and cost of manufacture.

In the embodiment of the invention shown in FIG. 2, which shows a drive that may be used either for mechanical operation or for programmed control, according to the invention a combined clutch-and-brake disk 25 is mounted axially adjustable from outside on drive shaft 5, i.e., so that it can be shifted. The constantly rotating clutch magnet armature ring 8 and/or a shoe brake 26 of known type with a friction lining 26a, mounted in a non-rotating position on housing 27, act on the clutch-and-brake disk 25. A brake drum 26b is attached to clutch-and-brake disk 25.

A drive according to the embodiment of the invention as shown in FIG. 2 is especially advantageous for industrial serving machines, since this drive may be controlled by mechanical, pneumatic or electrical means, or by a combination of these.

As in the embodiment of the invention shown in FIG. 2, the flywheel 2 supports the spring-mounted clutch magnet armature ring 8. The drive shaft 5 simultaneously carries the combined clutch-and-brake disk 25, which is set to rotating by the constantly rotating armature disk 8 under the influence of clutch magnet 10. Braking is accomplished by shoe brake 26, which may be activated in known fashion by mechanical, pneumatic, electrical or combined means. The clutch-and-brake axle disk 25 is moved in or out by an adjusting screw 21. The bearing housing 27 serves simultaneously as an electromagnet and is made of magnetically conducting material.

In both examples of the construction, the stator housing 7 is made of a non-magnetic material in order to prevent a magnetic shunt through the bearing plates.

In the embodiment according to FIG. 1, the drive from the motor (for example) is through a pulley 5' mounted on shaft 5 in the familiar manner. In the embodiment according to FIG. 2, such a pulley may be attached to shaft 5 on the side of the motor which is not shown.

The invention is not limited to the embodiments shown and described above. It also includes all advantageous modifications and especially all partial and sub-combinations of the features described and/or shown. In particular, it is not limited to sewing machine motors, but may also be used for motors for any other purpose.

I claim:

1. In an electric motor comprising a housing, a rotor and a stator, the improvement wherein said motor further includes integrated speed control of its output, wherein said improved motor comprises:
   a constantly revolving unit including said rotor and a flywheel connected thereto;
   an intermittently revolving unit including a single axial shaft which is the only output shaft of said motor, said shaft extending through said housing; and
   a stationary unit including said housing and said stator, wherein
   said intermittently revolving unit further includes a clutch disk and a brake disk, both of said disks being non-axially-displaceable and non-rotatably attached to said shaft on opposite sides of said rotor,
   said constantly revolving unit is axially non-displaceably but rotatably mounted about said shaft and further includes an axially displaceable clutch magnetic armature connected to said flywheel, and
   said stationary unit further includes an axially displaceable brake magnetic armature mounted on said housing and magnetic means fixedly mounted in said housing in association with each of said clutch magnetic armature and said brake magnetic armature for controllably magnetically attracting said clutch magnetic armature and said brake magnetic armature and thereby causing said armatures to move into contact respectively with said clutch disk and said brake disk against axially directed spring actions,
   said intermittently revolving unit further including set screw adjustment means on each end of said shaft for moving said brake and clutch disks respectively axially along said shaft,
   wherein said intermittently revolving unit is connected to said constantly revolving unit upon activation of said magnetic means associated with said clutch magnetic armature and said intermittently revolving unit is connected to said stationary unit upon activation of said magnetic means associated with said brake magnetic armature, each of said magnetic means forming one bearing plate of said housing on opposite sides of said rotor.

2. A drive in accordance with claim 1 wherein said set screw adjustment means comprise set screws mounted on said shaft and passing through said housing so as to be externally adjustable.

3. A drive in accordance with claim 1 wherein said clutch disk and said brake disk are made in an identical shape.

* * * * *